(12) United States Patent  
Donahue

(10) Patent No.: US 9,334,830 B2  
(45) Date of Patent: May 10, 2016

(54) PISTON ASSEMBLY FOR A RECIPROCATING ENGINE

(71) Applicant: GENERAL ELECTRIC COMPANY, Schenectady, NY (US)

(72) Inventor: Richard John Donahue, West Bend, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/298,869

(22) Filed: Jun. 6, 2014

(65) Prior Publication Data

US 2015/0354496 A1      Dec. 10, 2015

(51) Int. Cl.
| | |
|---|---|
| *F16J 9/12* | (2006.01) |
| *F02F 3/00* | (2006.01) |
| *F02F 1/20* | (2006.01) |
| *F16J 9/08* | (2006.01) |

(52) U.S. Cl.
CPC ... *F02F 3/00* (2013.01); *F02F 1/20* (2013.01); *F16J 9/08* (2013.01)

(58) Field of Classification Search
CPC .................... F16J 1/00; F16J 9/12; F16J 9/00
USPC ....................................................... 277/447
See application file for complete search history.

(56) References Cited

U.S. PATENT DOCUMENTS

| | | | |
|---|---|---|---|
| 1,467,256 A * | 9/1923 | Thomson .................. | 277/493 |
| 1,815,418 A | 7/1931 | Garvin | |
| 1,822,101 A | 9/1931 | Lewis | |
| 1,936,430 A | 11/1933 | Godron | |
| 1,959,566 A | 5/1934 | Brubaker | |
| 2,233,723 A | 3/1941 | Ballard | |
| 2,328,912 A | 9/1943 | Kotzback | |
| 2,566,603 A * | 9/1951 | Dykes .......................... | 277/447 |
| 2,591,176 A | 4/1952 | Mason | |
| 2,610,098 A | 9/1952 | Reiners | |
| 2,892,645 A | 6/1959 | Tydeman | |
| 2,914,368 A | 11/1959 | Farmer et al. | |
| 3,033,578 A | 5/1962 | Kellogg | |
| 3,364,675 A | 1/1968 | Dorer | |

(Continued)

FOREIGN PATENT DOCUMENTS

| | | | | |
|---|---|---|---|---|
| DE | 102008014859 A1 * | 10/2009 | ................. | F16J 9/00 |
| EP | 1248022 A2 | 10/2002 | | |

(Continued)

OTHER PUBLICATIONS

U.S. Appl. No. 14/298,864, filed Jun. 6, 2014, Donahue.

(Continued)

*Primary Examiner* — Lindsay Low  
*Assistant Examiner* — Kevin Lathers  
(74) *Attorney, Agent, or Firm* — Fletcher Yoder, P.C.

(57) ABSTRACT

A power cylinder system for a reciprocating engine includes a piston configured to be disposed within a cylinder and to move in a reciprocating manner within the cylinder. The piston also includes a top-most groove extending circumferentially about the piston beneath a top land of the piston and a ring disposed within the top-most groove. A single channel is formed in the top land or the ring, and the single channel extends from an outer perimeter of the piston to a space between an inner surface of the top-most groove and an inner face of the ring.

19 Claims, 7 Drawing Sheets

(56) References Cited

U.S. PATENT DOCUMENTS

| | | | |
|---|---|---|---|
| 3,396,976 A | 8/1968 | Reinhoudt et al. | |
| 3,554,564 A | 1/1971 | Lassanske | |
| 3,608,911 A | 9/1971 | Prasse et al. | |
| 3,667,443 A | 6/1972 | Currie et al. | |
| 3,806,137 A | 4/1974 | Prasse et al. | |
| 4,154,207 A | 5/1979 | Brehob | |
| 4,235,447 A | 11/1980 | Davison, Jr. | |
| 4,358,121 A | 11/1982 | Sand | |
| RE32,395 E | 4/1987 | Geffroy et al. | |
| 4,669,369 A | 6/1987 | Holt et al. | |
| 4,681,326 A | 7/1987 | Kubo | |
| 4,736,586 A | 4/1988 | Kawajiri et al. | |
| 4,836,093 A | 6/1989 | Wagner | |
| 4,848,212 A | 7/1989 | Kawano et al. | |
| 5,083,536 A * | 1/1992 | Ariga | F16J 9/08 123/193.6 |
| 5,133,563 A | 7/1992 | Casellato | |
| 5,253,877 A | 10/1993 | DeBiasse et al. | |
| 5,392,692 A | 2/1995 | Rao et al. | |
| 5,430,938 A | 7/1995 | Rao et al. | |
| 5,474,307 A | 12/1995 | DeBiasse | |
| 5,490,445 A | 2/1996 | Rao et al. | |
| 5,517,379 A | 5/1996 | Williams et al. | |
| 5,564,699 A | 10/1996 | Lawrence et al. | |
| 5,779,243 A | 7/1998 | Hanlon | |
| 6,131,503 A | 10/2000 | Takashima | |
| 6,378,482 B2 | 4/2002 | Marcil | |
| 6,536,385 B1 | 3/2003 | Takashima | |
| 7,068,011 B2 | 6/2006 | Yang | |
| 7,207,571 B2 | 4/2007 | Yoshida et al. | |
| 7,312,653 B2 | 12/2007 | Chen et al. | |
| 7,493,882 B2 | 2/2009 | Hiraishi et al. | |
| 7,642,748 B2 | 1/2010 | Glosser, Jr. et al. | |
| 7,730,866 B2 | 6/2010 | Melchior | |
| 7,740,448 B2 | 6/2010 | Meyer et al. | |
| 7,854,191 B2 | 12/2010 | Kariya | |
| 2002/0158609 A1 | 10/2002 | Lavington et al. | |
| 2004/0094902 A1 | 5/2004 | Brunke | |
| 2004/0134457 A1 | 7/2004 | Evans | |

FOREIGN PATENT DOCUMENTS

| | | |
|---|---|---|
| EP | 2551503 A1 | 1/2013 |
| FR | 1304041 A | 9/1962 |
| GB | 1042090 A | 9/1966 |
| JP | 56110541 A | 9/1981 |
| JP | 6124876 A | 2/1986 |
| JP | 2001336447 A | 12/2001 |
| JP | 2009243357 A | 10/2009 |
| NL | 39704 C | 7/1936 |
| WO | 9730277 | 8/1997 |

OTHER PUBLICATIONS

U.S. Appl. No. 14/298,867, filed Jun. 6, 2014, Donahue.
U.S. Appl. No. 14/452,509, filed Aug. 5, 2014, Donahue.
U.S. Appl. No. 14/452,515, filed Aug. 5, 2014, Donahue.
U.S. Appl. No. 14/595,013, filed Jan. 12, 2015, Donahue.
U.S. Appl. No. 14/470,968, filed Aug. 28, 2014, Longhui Shen et al.
U.S. Appl. No. 14/452,509, filed Aug. 5, 2014, Richard John Donahue.
U.S. Appl. No. 14/298,867, filed Jun. 6, 2014, Richard John Donahue.
U.S. Appl. No. 14/452,515, filed Aug. 5, 2014, Richard John Donahue.
U.S. Appl. No. 14/595,013, filed Jan. 12, 2015, Richard John Donahue et al.
Dykes, "Pressure-Backed Piston Rings, Passage", Pressure-Backed Piston Rings, pp. 2-22, Dec. 1, 1951.
European Search Report and Opinion issued in connection with corresponding EP Application No. 15170678.5 on Aug. 7, 2015.
European Search Report and Opinion issued in connection with corresponding EP Application No. 15170677.7 on Aug. 7, 2015.
European Search Report and Opinion issued in connection with corresponding EP Application No. 15169854.5 on Nov. 6, 2015.
European Search Report and Opinion issued in connection with corresponding EP Application No. 15179639.8 on Dec. 17, 2015.
European Search Report and Opinion issued in connection with corresponding EP Application No. 15179641.4 on Dec. 17, 2015.

* cited by examiner

PISTON ASSEMBLY FOR A RECIPROCATING ENGINE

BACKGROUND

The subject matter disclosed herein relates generally to reciprocating engines, and, more particularly to a piston assembly for a reciprocating engine.

A reciprocating engine (e.g., a reciprocating internal combustion engine) combusts fuel with an oxidant (e.g., air) to generate hot combustion gases, which in turn drive a piston (e.g., a reciprocating piston) within a cylinder. In particular, the hot combustion gases expand and exert a pressure against the piston that linearly moves the piston from a top portion to a bottom portion of the cylinder during an expansion stroke. The piston converts the pressure exerted by the combustion gases and the piston's linear motion into a rotating motion (e.g., via a connecting rod and a crankshaft coupled to the piston) that drives one or more loads, e.g., an electrical generator. The construction of the piston and associated structures (e.g., a piston assembly) can significantly impact emissions (e.g., unburned hydrocarbons) and engine efficiency, as well as lubricant (e.g., oil) consumption. Furthermore, the construction of the piston assembly can significantly affect the operating life of the reciprocating engine. Therefore, it would be desirable to improve the construction of the piston assembly.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a power cylinder system for a reciprocating engine includes a piston configured to be disposed within a cylinder and to move in a reciprocating manner within the cylinder. The piston also includes a top-most groove extending circumferentially about the piston beneath a top land of the piston and a ring disposed within the top-most groove. A single channel is formed in the top land or the ring, and the single channel extends from an outer perimeter of the piston to a space between an inner surface of the top-most groove and an inner face of the ring.

In one embodiment, a power cylinder system for a reciprocating engine includes a piston configured to be disposed within a cylinder and to move in a reciprocating manner within the cylinder. The piston assembly includes a top-most groove extending circumferentially about the piston beneath a top land of the piston and ring positioned in the top-most groove. A channel is formed in the top land or the ring and is configured to enable combustion gases to flow from a combustion chamber to a space between an inner surface of the top-most groove and an inner face of the ring, and the channel has a width that is between about one percent and five percent of a diameter of the piston.

In one embodiment, a power cylinder system for a reciprocating engine includes a cylinder having an inner wall and defining a cavity. The system includes a piston disposed within the cylinder and configured to move in a reciprocating manner within the cylinder, a top-most groove extending circumferentially about the piston beneath a top land of the piston, and a ring positioned within the top-most groove. A radial channel is formed in the top land or the ring in a low deposit region relative to other regions of the piston, and the radial channel extends from an outer perimeter of the piston toward a space formed between an inner surface of the top-most groove and an inner face of the ring.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
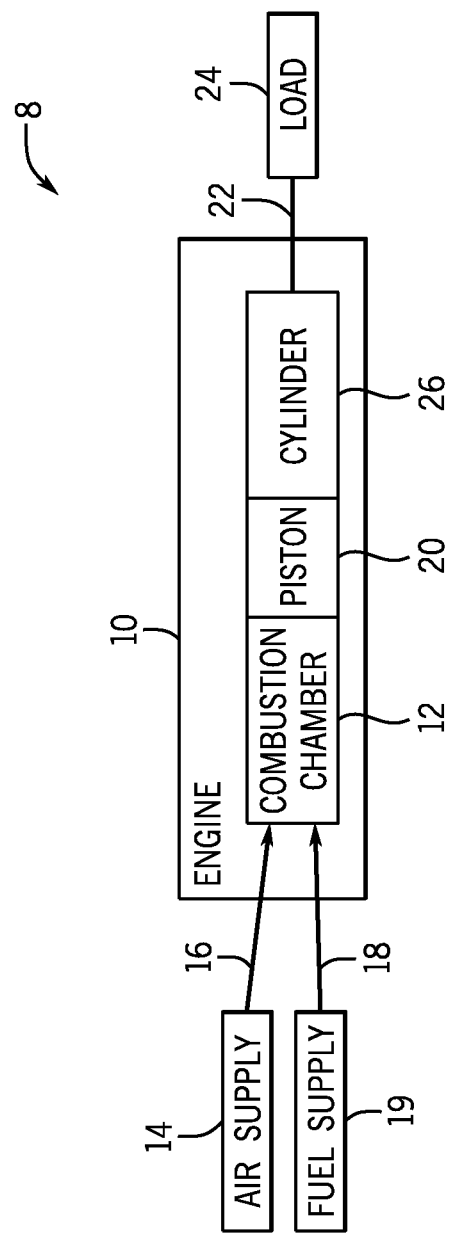
FIG. 1 is a schematic block diagram of an embodiment of a portion of a reciprocating engine system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Power cylinder systems for reciprocating engines (e.g., reciprocating internal combustion engines) in accordance with the present disclosure may include one or more pistons each configured to move linearly within a cylinder (e.g., a liner) to convert pressure exerted by combustion gases and the piston's linear motion into a rotating motion to power one or more loads. The piston may have a top annular groove (e.g., a top ring groove) extending circumferentially about the piston beneath a top land of a piston. A top ring (e.g., a top piston ring) may be disposed within the top groove. Without the disclosed embodiments, certain pressure gradients across the top ring (e.g., between an outer face and an inner face of the top ring) may cause radial ring collapse (e.g., movement of the top ring away from the inner wall of the cylinder), increased oil consumption, increased blowby of unburned hydrocarbons, increased emissions, and/or increased wear on the components of the engine, for example.

Thus, embodiments of the present disclosure include at least one channel (e.g., a radial channel, an axial channel, or both) to transfer high pressure combustion gases to a space adjacent to an inner face (e.g., an inner circumferential face) of the top ring, which reduces the pressure gradient across the top ring and enables the gases to exert a radially-outward directed force on the inner face of the top ring. Because carbon deposits may form in various locations of the engine due to carbonization of unburned fuels and/or lubricating oil, exemplary embodiments include a single channel (e.g., only one channel) having a shape and/or dimensions (e.g., a width, a diameter, a cross-sectional flow area, or a volume) that reduce the likelihood that carbon deposits will interfere with or block transfer of the combustion gases through the one channel. Thus, the present embodiments enable durable, reliable transfer of the combustion gases through the at least one channel.

Additionally, the dimensions of the one channel may be large enough to enable reliable transfer of the combustion gases, but may also be small enough so that a total crevice volume between the top land of the piston and the top ring limits a flow of unburned fuel within the crevice volume. For example, while multiple channels having dimensions that enable reliable transfer of the combustion gases may effectively reduce the pressure differential across the top ring, such a configuration also increases the overall crevice volume and enables a greater volume of unburned fuel to flow into the crevice volume. Thus, the dimensions of the one channel for reliable top ring stabilization may be balanced with the total crevice volume to limit undesirable changes in engine efficiency, for example.

In view of the foregoing, the presently disclosed embodiments include a single channel (e.g., only one channel) associated with each piston of the engine to facilitate transfer of combustion gases to the space adjacent to the inner face of the top ring to reduce the pressure gradient across the top ring. The one channel may have dimensions that enable reliable transfer of an appropriate volume of combustion gases to stabilize the top ring and/or that limit unburned fuel that flows into the crevice volume. Additionally, the one channel may be positioned in a relatively low temperature region and/or a low oil region of the engine to block the formation of carbon deposits. Advantageously, the piston having the features disclosed herein may effectively and efficiently stabilize the top ring, while limiting the formation of carbon deposits and/or limiting flow of unburned fuel in the crevice volume. In turn, these features may result in reduced radial ring collapse, as well as reduced blowby, oil consumption, and/or emissions, for example.

It should be understood that although embodiments having one channel are disclosed in detail below, two or more channels (e.g., 2, 3, 4, 5, 6, 7, 8, 9, 10, or more) may be utilized for each piston to enable reliable transfer of combustion gases and limit the crevice volume, particularly when the two or more channels are positions in low temperature and/or low oil regions of the engine. For example, in certain embodiments, each piston may include a limited number of channels (e.g., one, two, three, four, or more channels) defining a total crevice volume area within some threshold to limit changes in engine efficiency, wherein each channel has a width and/or a cross-sectional area above some minimum threshold to reduce the likelihood that carbon deposits will interfere with or block transfer of the combustion gases through each channel, as discussed in more detail below.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 14. The combustion chamber 14 is also configured to receive a fuel 18 (e.g., a liquid and/or gaseous fuel) from a fuel supply 19, and a fuel-air mixture ignites and combusts within each combustion chamber 14. The hot pressurized combustion gases cause a piston 20 adjacent to each combustion chamber 14 to move linearly within a cylinder 26 and convert pressure exerted by the gases into a rotating motion, which causes a shaft 22 to rotate. Together, the piston 20 and the cylinder 26 may form a power cylinder system for the engine 10. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. In certain embodiments, the piston 20 may be a steel piston or an aluminum piston with a Ni-resist ring insert in a top ring groove of the piston 20. The system 8 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, or 900 RPM. In some embodiments, the engine 10 may operate between approximately 800-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

Figure 2:
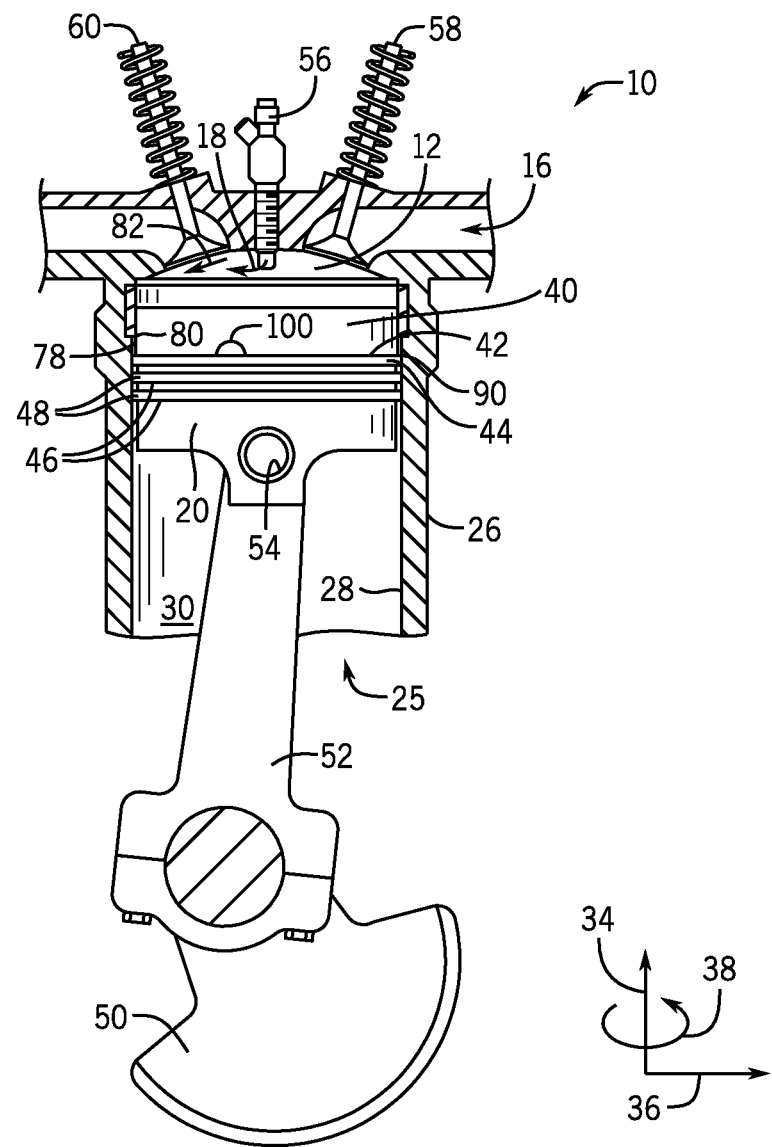
FIG. 2 is a cross-sectional view of an embodiment of a piston positioned within a cylinder.

FIG. 2 is a side cross-sectional view of an embodiment of a piston assembly 25 having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land) and a first annular groove 42 (e.g., a top groove or a top ring groove) extending circumferentially (e.g., in the circumferential direction 38) about the piston 20. A first ring 44 (e.g., a top ring or a top piston ring) may be positioned in the top groove 42. The top ring 44 may be configured to expand and contract in response to high temperatures and high pressure gases to which the top ring 44 is subjected during operation of the engine 10. As shown, the piston 20 includes a plurality of additional annular grooves 46 (e.g., additional ring grooves) extending circumferentially about the piston 20 and spaced apart from the top groove 42 and from one another along the axial axis 34. An additional piston ring 48 is positioned in each of the additional annular grooves 46. Various features are disclosed herein with respect to the top groove 42 and the top ring 44. However, it should be understood that the plurality of additional grooves 46 and the corresponding additional piston rings 48 may have any of a variety of configurations. For example, one or more of the plurality of additional grooves 46 and/or corresponding additional rings 48 may include some or all of the features disclosed below or may have different configurations, shapes, sizes, and/or functions, for example.

As shown, the piston 20 is attached to a crankshaft 50 via a connecting rod 52 and a pin 54. The crankshaft 50 translates the reciprocating linear motion of the piston 24 into a rotating motion. The combustion chamber 14 is positioned adjacent to the top land 40 of the piston 24. A fuel injector 56 provides the fuel 18 to the combustion chamber 14 and a valve 58 controls the delivery of air 16 to the combustion chamber 14. An exhaust valve 60 controls discharge of exhaust from the engine 10. However, it should be understood that any suitable elements and/or techniques for providing fuel 18 and air 16 to the combustion chamber 14 and/or for discharging exhaust may be utilized.

In operation, combustion of the fuel 18 with the air 16 in the combustion chamber 14 cause the piston 20 to move in a reciprocating manner (e.g., back and forth) in the axial direction 34 within the cavity 30 of the cylinder 26. As the piston 20 moves, the crankshaft 50 rotates to power the load 24 (shown in FIG. 1), as discussed above. A clearance 78 (e.g., a radial clearance defining an annular space) is provided between the inner annular wall 28 of the cylinder 26 and an outer surface 80 (e.g., an annular surface) of the piston 20. The top ring 44 is configured to protrude radially-outward from the top groove 42 into the clearance 78 and to contact the inner annular wall 28 of the cylinder 26. The top ring 44 generally blocks the fuel 18 and the air 16, or a fuel-air mixture 82, from escaping from the combustion chamber 14 and/or facilitates maintenance of suitable pressure to enable the expanding hot combustion gases to cause the reciprocating motion of the piston 20. Furthermore, the top ring 44 generally facilitates scraping of lubricant (e.g., oil), which coats the inner annular wall 28 and which controls heat and/or friction within the engine 10, for example. Thus, it is desirable to maintain contact between the top ring 44 and the inner annular wall 28. However, as discussed in more detail below, the combustion gases from the combustion chamber 14 contact an outer face 90 (e.g., an outer circumferential face) of the top ring 44 and exert a force that drives the top ring 44 radially-inward (e.g., along the radial axis 36) away from the inner wall 28 of the cylinder 26. Accordingly, a radial channel 100 (e.g., a passageway, trough, groove, or the like) may be provided to stabilize the top ring 44 and/or to enable the top ring 44 to maintain contact with the inner annular wall 28 of the cylinder 26, as discussed in more detail below.

Figure 3:
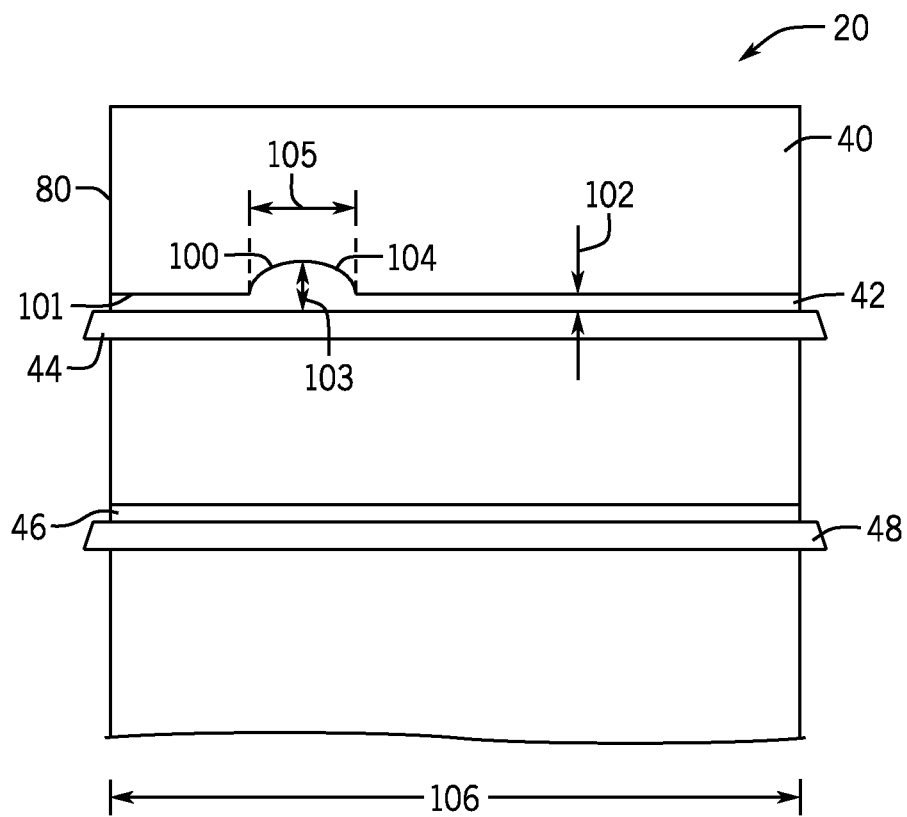
FIG. 3 is a side view of a portion of an embodiment of a piston having a radial channel formed in a top land of the piston.
Figure 3:
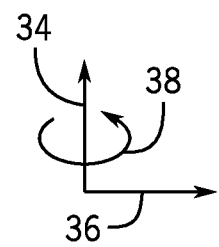

FIG. 3 is a side view of a portion of an embodiment of the piston 20 having the radial channel 100 formed in the top land 40 of the piston 20. As shown, the radial channel 100 is formed into or along an axially-facing surface 101 (e.g., an annular surface), which corresponds to both a bottom surface of the top land 40 and an upper surface (e.g., top surface or a top perimeter) of the top groove 42. The radial channel 100 may extend radially-inward (e.g., in the radial direction 36) from the outer surface 80 of the top land 40 of the piston 20. As shown, the radial channel 100 is open toward the top groove 42, and an axial distance 102 between the top ring 44 and the axially-facing surface 101 may vary circumferentially (e.g., along the circumferential axis 38) about the top ring 44 (e.g., as shown by a first axial distance 102 and a second axial distance 103, greater than the first axial distance 102 and coincident with the radial channel 100). Desirably, the first axial distance 102 between the axially-facing surface 101 and the top ring 44 may be configured to enable some degree of expansion and contraction of the top ring 44 due to the high temperatures and pressures during operation of the engine 10, while blocking excessive ring lift or ring flutter. Thus, the radial channel 100 facilitates transfer of the combustion gases from the cavity 30 (shown in FIG. 2) along the radial channel 100 to decrease the pressure gradient (e.g., substantially balance the pressure gradient) across the top ring 44 and may also enable the first axial distance 102 to be minimized to limit ring lift.

As noted above, the lubricating oil and certain fuels used in the engine 10 may produce carbon deposits. Such carbon deposits may adhere to various parts of the engine 10. However, the radial channel 100 may have a shape and/or dimensions (e.g., a width, a diameter, a cross-sectional area, and/or a volume) that enable reliable transfer of gases through the radial channel 100 (e.g., the radial channel 100 is not blocked by carbon deposits). In particular, the radial channel 100 may have any suitable cross-sectional shape. As shown, the radial channel 100 has a curved cross-section (e.g., the radial channel 100 is a radial slot having a curved wall 104, such as a semi-circular curved wall 104). In some embodiments, such curvature and/or the absence of sharp angles or corners in the curved wall 104 may minimize the adhesion of oil within the radial channel 100 and/or facilitate flow of the oil from the radial channel 100.

Additionally, the radial channel 100 may have any suitable dimensions. As shown, the radial channel 100 has a width 105 (e.g., a diameter). By way of example, the width 105 of the radial channel 100 may be approximately 1-10 millimeters (mm), 2-8 mm, or 3-5 mm. In some embodiments, the width 105 of the radial channel 100 may be less than approximately 10 mm, 8 mm, 6 mm, 4 mm, or 2 mm. By way of another example, the width 105 of the radial channel 100 may be approximately 2 percent of a bore diameter (shown in FIG. 4). In certain embodiments, the width 105 of the radial channel 100 may be approximately 0.5, 1, 2, 3, 4, 5, 6, 7, 8, 9, 10, or more percent of the bore diameter (shown in FIG. 4).

Figure 4:
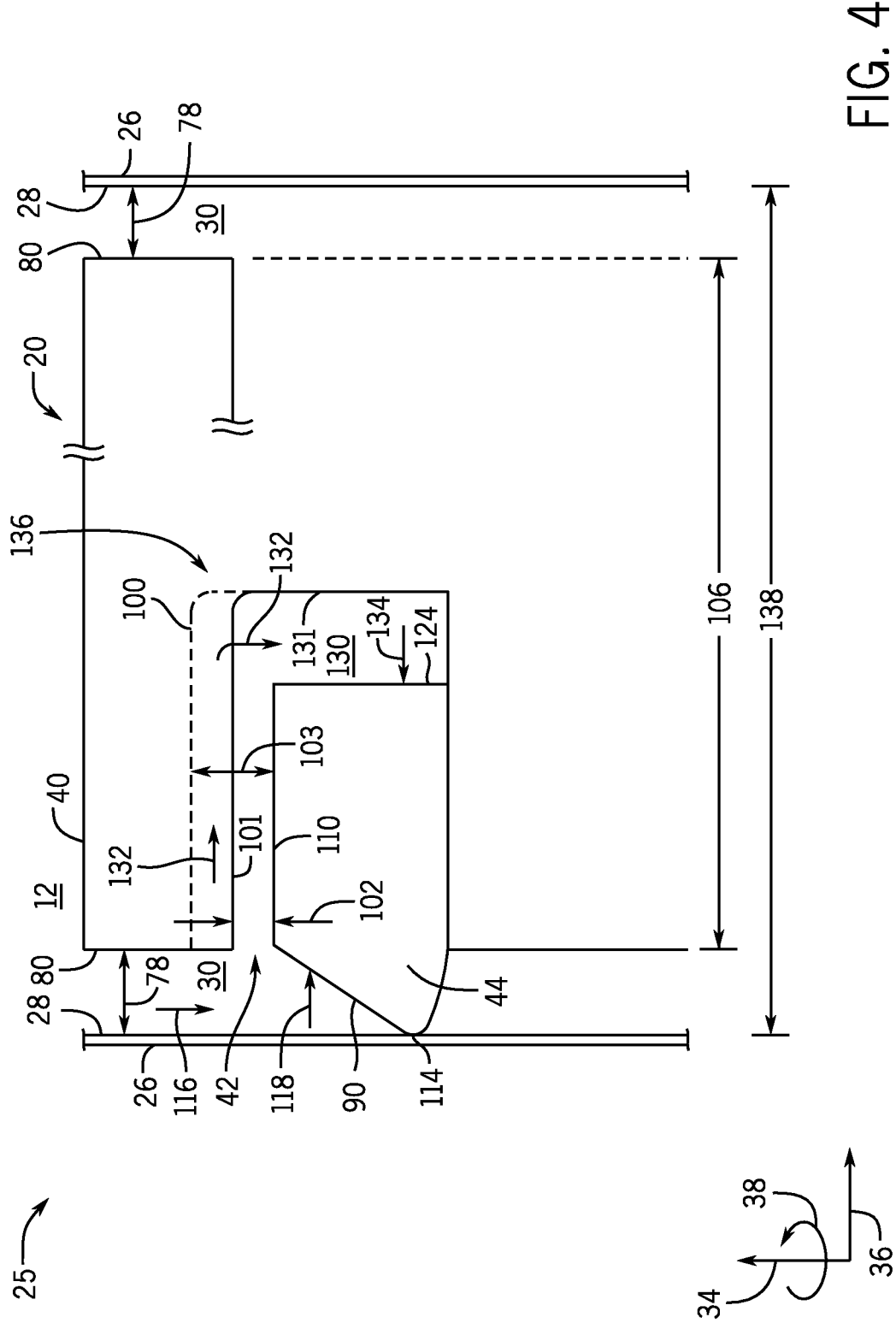
FIG. 4 is a side cross-sectional view of a portion of an embodiment of a piston having a radial channel formed in a top land of the piston.

In certain embodiments, the width 105 of the radial channel 100 may be 0.5-5 percent, 1-4 percent, or 2-3 percent of the bore diameter (shown in FIG. 4). In certain embodiments, the width 105 of the radial channel 100 may be approximately 2 percent of a piston diameter 106. In certain embodiments, the width 105 of the radial channel 100 may be approximately 0.5, 1, 2, 3, 4, 5, 6, 7, 8, 9, 10, or more percent of the piston diameter 106. In certain embodiments, the width 105 of the radial channel 100 may be 0.5-5 percent, 1-4 percent, or 2-3 percent of the piston diameter 106. Such dimensions may minimize adhesion between the radial channel 100 and the lubricating oil, enabling the oil to flow from the radial channel 100 and/or blocking the formation of carbon deposits within the radial channel 100. Additionally or alternatively, such dimensions may enable reliable transfer of combustion gases in the presence of some amount of carbon deposits. Additionally, the high temperature and high pressure conditions within the engine 10 may facilitate carbonization of incompletely burned fuel and/or the oil. Thus, the radial channel 100 may be positioned in relatively low temperature regions of the engine 10 to limit the formation of carbon deposits within the radial channel 100, as discussed in more detail below.

With the foregoing in mind, FIG. 4 is a side cross-sectional view of a portion of an embodiment of the piston assembly 25 having the top ring 44 positioned within the top groove 42 of the piston 20. The top ring 44 scrapes oil along the inner annular wall 28 of the cylinder 26 during a down-stroke. The outer surface 90 is configured to contact the inner wall 28 to form a sealing point 114 (e.g., an annular seal). The combustion gases flow toward the outer face 90 of the top ring 44 as shown by arrow 116, and thus, generate a radially-inward force 118 that drives the top ring 44 radially-inward (e.g., in the radial direction 36). An annular gap 120 provided between a top face 110 of the top ring 44 and the axially-facing surface 101 of the top groove 42 may enable some expansion (e.g., thermal expansion) of the top ring 44 within the top groove 42. However, the gap 120 may not enable efficient transfer of the combustion gases to a radially-inner face 124 (e.g., an inner circumferential face) of the top ring 44 as it is generally desirable for the first axial distance 102 (e.g., annular clearance) between the top face 110 of the top ring 44 and the axially-facing surface 101 to be minimized to control ring flutter and/or lift and to maintain ring stability, for example.

As discussed above, disclosed embodiments include one radial channel 100 that is configured to facilitate transfer of combustion gases to a space 130 adjacent to the inner face 124 of the top ring 44. The space 130 may be positioned adjacent to or defined by the inner face 124 of the top ring 44 and an inner surface 131 (e.g., an inner annular wall) of the top groove 42. In such cases, the axially-facing surface 101 and the top ring 44 are separated by the first distance 102 about most of the circumference of the top ring 44, thus controlling ring flutter and/or lift, while the combustion gases are permitted to flow from the cavity 30 and along the radial channel 100 into the space 130, as shown by arrow 132. Thus, the pressure gradient across the top ring 44 may be reduced (e.g., the pressure gradient between the annular outer face 90 and the inner face 124), and the combustion gases may exert a radially-outward force 134 that drives the top ring 44 radially-outward (e.g., along the radial axis 36) to counter the radially-inward force 118 exerted against the outer face 90 of the top ring 44.

While multiple radial channels 100 may be provided at discrete locations about the circumference of the top ring 44 to transfer the combustion gases to the space 130, such a configuration may increase a crevice volume 136 (e.g., a total volume of a space between the top ring 44 and the top land 40) and enable an increased flow of unburned fuels through the crevice volume 136. The increased flow of unburned fuels through the crevice volume 136 may, in turn, decrease the efficiency of the engine 10 and/or increase emissions. Additionally, as the width 105 of the radial channel 100 decreases, the likelihood of the radial channel 100 being blocked by carbon deposits generally increases and/or the reliability with which the radial channel 100 transfers combustion gases to the space 130 generally decreases. By way of example, one or more radial channels 100 of a small width 105 may not provide durable, reliable transfer of combustion gases. By way of additional example, multiple radial channels 100 of a larger width 105 for reliable transfer of combustion gases may increase the crevice volume 136 and decrease engine efficiency. Accordingly, the present embodiments include the one radial channel 100 having dimensions that enable reliable transfer of combustion gases to stabilize the top ring 44 and/or limit unburned fuel flowing through the crevice volume 136. As noted above, in exemplary embodiments, the width 105 of the radial channel 100 is approximately 2 percent of a bore diameter 138 or approximately 2 percent of the piston diameter 106. In certain embodiments, the diameter 105 may be approximately 0.5, 1, 2, 3, 4, 5, 6, 7, 8, 9, 10, or more percent of the bore diameter 138 or of the piston diameter 106. In certain embodiments, the diameter 105 may be 0.5-5 percent, 1-4 percent, or 2-3 percent of the bore diameter 138 or of the piston diameter 106. As noted above, in certain embodiments, more than one radial channel 100 each having a minimum threshold width (e.g., the width 105 of the radial channel 100 may be approximately 1-10 millimeters (mm), 2-8 mm, or 3-5 mm) to minimize the formation of carbon deposits within each radial channel 100 may be provided, and the number and dimensions of the radial channels 100 may be limited such that a total crevice volume 136 is within (e.g., below) a predetermined threshold to limit changes in engine efficiency, for example.

Figure 5:
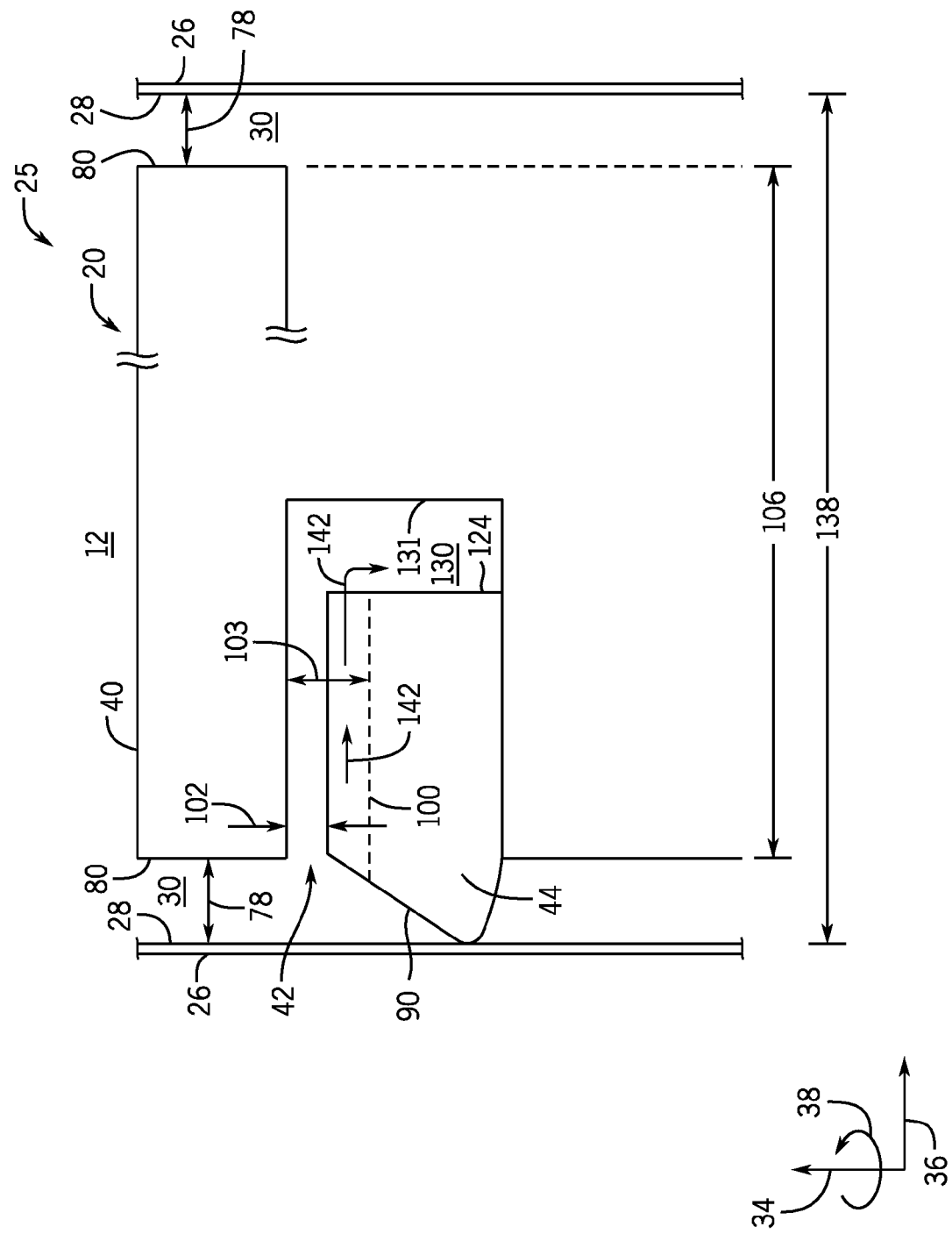
FIG. 5 is a side cross-sectional view of a portion of an embodiment of a piston having a radial channel formed in a top piston ring.

FIG. 5 is a side cross-sectional view of a portion of an embodiment of the piston assembly 25 having a radial channel 100 formed in the top ring 44. As shown, the radial channel 100 is formed in the top face 110 of the top ring 44. The radial channel 100 formed in the top ring 44 may extend radially-inward (e.g., in the radial direction 36) from the outer face 90 to the inner face 124 of the top ring 44. The axial distance 102 between the top ring 44 and the axially-facing surface 101 may vary circumferentially (e.g., along the circumferential axis 38) about the top ring 44 (e.g., as shown by the first axial distance 102 and the second axial distance 103, greater than the first axial distance 102 and coincident with the radial channel 100). Thus, the radial channel 100 may facilitate flow of the combustion gases from the cavity 30 to the space 130 adjacent to the inner face 124, as shown by arrow 142. As discussed above, the transfer of combustion gases to the space 130 may control the pressure differential between the outer face 90 and the inner face 124 of the top ring 44, and thus enable the top ring 44 to maintain contact with the inner wall 28 of the cylinder 26 during operation of the engine 10. The radial channel 100 formed in the top ring 44 may also have a shape and/or dimensions (e.g., the width 105, the cross-sectional area, and/or the volume) that enable reliable transfer of combustion gases to stabilize the top ring 44 and/or limit the unburned fuel flowing through the crevice volume 136. As noted above, in exemplary embodiments, the width 105 of the radial channel 100 is approximately 2 percent of the bore diameter 138 or of the piston diameter 106. In certain embodiments, the diameter 105 may be approximately 0.5, 1, 2, 3, 4, 5, 6, 7, 8, 9, 10, or more percent of the bore diameter 138 or the piston diameter 106. In certain embodiments, the diameter 105 may be 0.5-5 percent, 1-4 percent, or 2-3 percent of the bore diameter 138 or the piston diameter 106.

Figure 6:
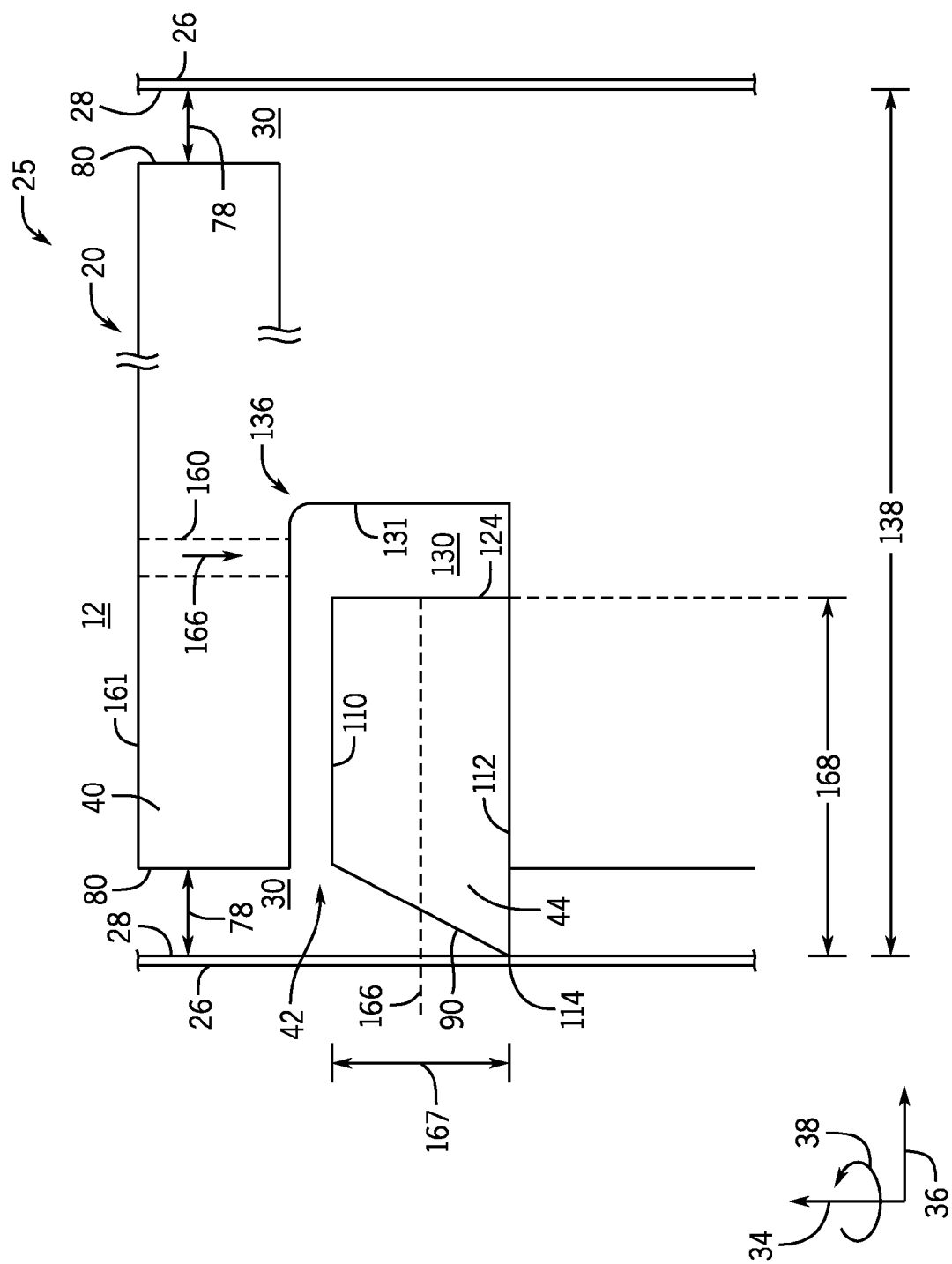
FIG. 6 is a side cross-sectional view of a portion of an embodiment of a piston having an axial channel formed in a top land of the piston.

FIG. 6 is a side cross-sectional view of a portion of an embodiment of the piston 20 having one axial channel 160 through the top land 40 of the piston 20. The one axial channel 160 extends in the axial direction 34 from a top surface 161 of the piston 20 through the top land 40 to the space 130. Thus, the axial channel 160 may facilitate flow of the combustion gases from the combustion chamber 14 to the space 130 adjacent to the inner face 124, as shown by arrow 166. As discussed above, the transfer of gases to the space 130 may control the pressure differential between the outer face 90 and the inner face 124 of the top ring 44, and thus enable the top ring 44 to maintain contact with the inner wall 28 of the cylinder 26. The axial channel 160 may also have dimensions (e.g., a diameter 164, a cross-sectional area, and/or a volume) that enable the transfer of combustion gases to stabilize the top ring 44 and/or limit the unburned fuel flowing into and/or through the crevice volume 136.

Additionally, as shown in FIG. 6, the top ring 44 may have an asymmetrical profile (e.g., an asymmetrical cross-section) about a radial axis 166, such as a tapered profile or partially tapered profile (e.g., a conical or curved annular profile), that is configured to effectively and efficiently scrape oil from an inner wall of the cylinder during a down-stroke (e.g., an expansion stroke) of the piston. As shown, the top ring 44 is tapered across a height 167 of the top ring 44. A radius 168 (and thus a diameter) of the top ring 44 increases between the top face 110 and a bottom face 112 of the top ring 44. The smallest radius 168 of the top ring 44 coincides with the top face 110, while the largest radius 168 of the top ring 44 coincides with the bottom face 112. In such a configuration, the outer surface 90 is configured to contact the inner annular wall 28 to form the sealing point 114 (e.g., an annular seal) at or proximate to the bottom face 112 of the top ring 44. In the illustrated embodiment, the outer face 90 has a linear profile, although the profile may be stepped or curved (e.g., convex or concave). Although the tapered profile or partially tapered profile may cause a pressure gradient across the top ring 44, the radial channel 100 or the axial channel 160 may be configured to transfer combustion gases to the space 130 to control the pressure across the top ring 44 and to stabilize the top ring 44, in the manner set forth above.

The high temperature and high pressure conditions within the engine 10 may facilitate carbonization of incompletely burned fuel and/or the oil, and carbon deposits may form in certain regions of the engine 10. Accordingly, it may be desirable to position the one radial channel 100 and/or the one axial channel 160 in a low-temperature region and/or a low-oil region of the engine 10 to limit or to block the formation of carbon deposits within the radial channel 100 and/or the one axial channel 160. The low-temperature region may vary by engine type and/or engine model, and may generally include a portion of the piston assembly 25 (e.g., a portion of the piston 20, the top land 40, the top groove 42, the top ring 44, or the like) that demonstrates an average temperature that is at least approximately 2, 3, 4, 5, 6, 7, 8, 9, 10, 15, 20 or more percent cooler than the average overall temperature of the piston assembly 25 or the portion of the piston assembly 25 during operation of the engine 10 at rated temperatures, for example. Additionally, the low-oil region may vary by engine type and/or engine model, and may generally include a portion of the piston assembly 25 (e.g., a portion of the piston 20, the top land 40, the top groove 42, the top ring 44, or the like) that supports approximately 1, 2, 3, 4, 5, 6, 7, 8, 9, 10, 15, 20 or more percent less oil than the average volume of oil supported by other portions of the piston assembly 25 during operation of the engine 10 at rated temperatures, for example.

Figure 7:
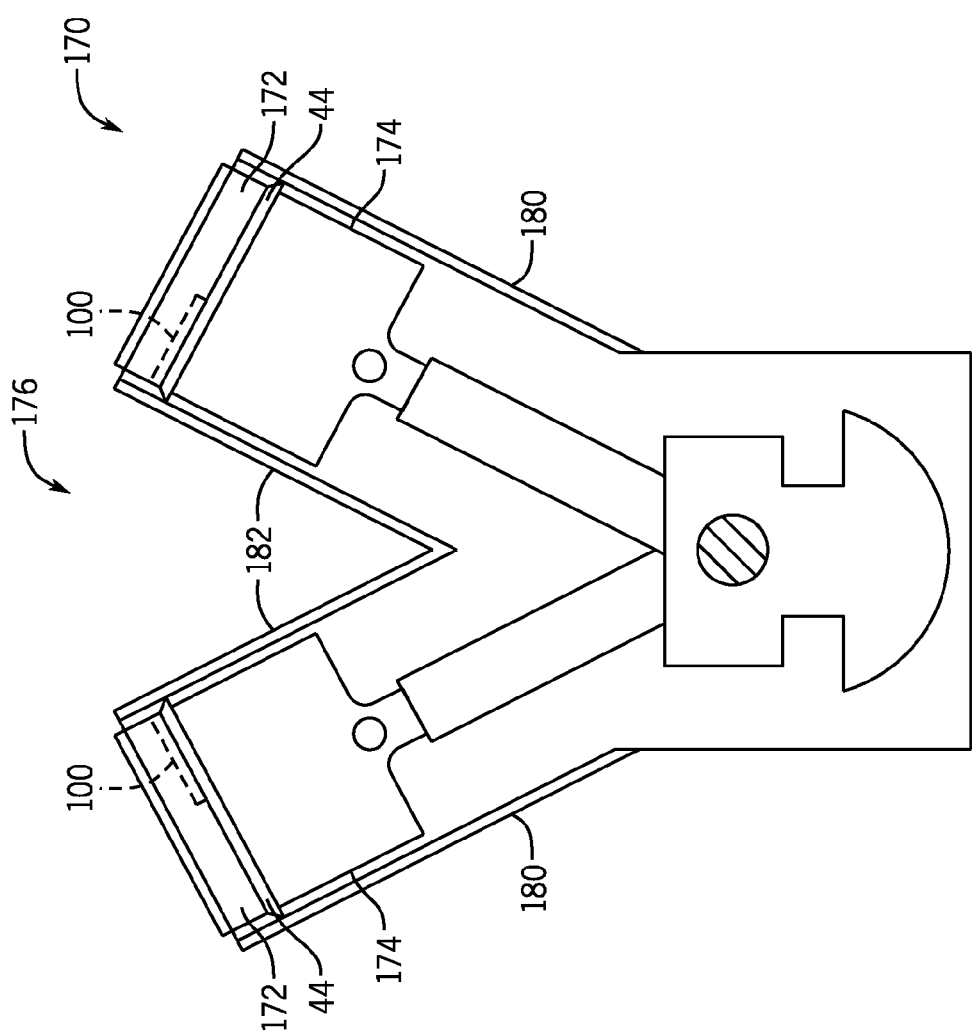
FIG. 7 is a side cross-sectional view of a portion of an embodiment of a Vee-type engine having a radial channel positioned proximate a central region the Vee-type engine.

Accordingly, FIG. 7 is a side cross-sectional view of a Vee-type (or V-type) engine 170 having the one radial channel 100 formed in a top land 172 of each piston 174 of the Vee-type engine 170. Although shown with one radial channel formed in the top land 172, it should be understood that one radial channel 100 may be formed in the top ring 44 (as shown in FIG. 5) or one axial channel 160 (as shown in FIG. 6) may be formed in the top land 172 of each piston 174 of the Vee-type engine 170, as set forth above. The one radial channel 100 is provided in a center region 176 of the Vee-type engine 170, which is generally a relatively low-oil region. During operation of the Vee-type engine 170, a relatively large volume of oil tends to accumulate on a first annular side 180 (e.g., a lower side), while a relatively small volume of oil may to accumulate on a second annular side 182 (e.g., an upper side). Thus, carbon deposits may not form in the radial channel 100 positioned in the center region 176, and the radial channel 100 may reliably transfer the combustion gases as set forth above.

Technical effects of the disclosed embodiments include providing systems for controlling the distribution of combustion gases within the engine 10 via a channel, such as a radial channel 100 and/or an axial channel 160. For example, the combustion gases may exert pressure against the outer face 90 of the top ring 44 of the piston assembly 25. The radial channel 100 or the axial channel 160 may transfer the combustion gases to the space 130 adjacent to the inner surface 124 of the top ring 44, thus controlling the pressure gradient between the outer face 90 and the inner face 124. The radial channel 100 or the axial channel 160 may have dimensions that enable the transfer of combustion gases to stabilize the top ring 44, while also limiting the crevice volume 136. Such a configuration may advantageously reduce oil consumption, emissions, blowby, radial ring collapse, and/or wear on components of the engine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power cylinder system for a reciprocating engine, comprising:
    a piston configured to be disposed within a cylinder and to move in a reciprocating manner within the cylinder;
    a top-most groove extending circumferentially about the piston beneath a top land of the piston;
    a ring disposed within the top-most groove; and
    a single channel formed in the top land or the ring, wherein the single channel extends from an outer perimeter of the piston to a space between an inner surface of the top-most groove and an inner face of the ring, the single channel is positioned at a discrete location about a circumference of the piston, the single channel extends about less than the circumference of the piston, and the single channel is positioned at a low-temperature region of the top-most groove that demonstrates an average temperature that is at least five percent cooler than an average overall temperature of the top-most groove during operation of the reciprocating engine at rated temperatures.

2. The system of claim 1, wherein the single channel extends into an axially upper surface of the top-most groove.

3. The system of claim 1, wherein the single channel extends radially along an axially upper surface of the top-most groove.

4. The system of claim 1, wherein the single channel extends axially through the top land of the piston to the space.

5. The system of claim 1, wherein the single channel is positioned at a central region of a V-type engine.

6. The system of claim 1, wherein the piston has a diameter and the single channel has a width that is at least approximately two percent of the diameter.

7. The system of claim 1, wherein the ring comprises a radially outer face disposed opposite a radially inner face, and the radially outer face comprises an asymmetrical profile.

8. The system of claim 1, comprising the cylinder.

9. The system of claim 1, wherein the single radial channel is formed in the ring.

10. A power cylinder system for a reciprocating engine system, comprising:
   a piston configured to be disposed within a cylinder and to move in a reciprocating manner within the cylinder;
   a top-most groove extending circumferentially about the piston beneath a top land of the piston;
   a ring positioned in the top-most groove; and
   a channel formed in the top land or the ring and configured to enable combustion gases to flow from a combustion chamber to a space between an inner surface of the top-most groove and an inner face of the ring, wherein the channel is positioned at a discrete location about a circumference of the piston, the channel extends about less than the circumference of the piston, and the channel has a width that is between approximately one percent and three percent of a diameter of the piston.

11. The system of claim 10, wherein only a single channel is formed in the top land or the ring.

12. The system of claim 10, wherein the channel extends into a perimeter of the top-most groove.

13. The system of claim 10, wherein the channel extends in a radial direction.

14. The system of claim 10, wherein the channel is positioned at a central region of a V-type engine.

15. The system of claim 10, wherein the channel is positioned at a low temperature region of the top-most groove that demonstrates an average temperature that is at least five percent cooler than an average overall temperature of the top-most groove during operation of the reciprocating engine at rated temperatures.

16. The system of claim 10, wherein the channel extends axially through the top land of the piston to the space.

17. The system of claim 10, wherein the channel is formed in the top land or the ring at a low deposit region of the top-most groove that supports at least five percent less oil than an average volume of oil supported by other portions of the top-most groove.

18. A power cylinder system for a reciprocating engine, comprising:
   a cylinder having an inner wall and defining a cavity;
   a piston disposed within the cylinder and configured to move in a reciprocating manner within the cylinder;
   a top-most groove extending circumferentially about the piston beneath a top land of the piston;
   a ring positioned within the top-most groove; and
   a radial channel formed in the top land at a low deposit region of the top-most groove that supports at least five percent less oil than an average volume of oil supported by other portions of the top-most groove, wherein the radial channel extends from an outer perimeter of the piston toward a space formed between an inner surface of the top-most groove and an inner face of the ring, the radial channel is positioned at a discrete location about a circumference of the piston, the radial channel extends about less than the circumference of the piston, and only a single radial channel is formed in the top land.

19. The system of claim 18, wherein the radial channel is formed in the top land at a low-temperature region of the top-most groove that demonstrates an average temperature that is at least five percent cooler than an average overall temperature of the top-most groove during operation of the reciprocating engine at rated temperatures.

* * * * *